United States Patent
Fukami

(10) Patent No.: US 7,378,120 B2
(45) Date of Patent: May 27, 2008

(54) FISH SAUCE AND METHOD FOR PRODUCING SAME

(75) Inventor: Katsuya Fukami, Ibaraki-ken (JP)

(73) Assignee: Japan Tobacco, Inc., Tokyo (JP)

( * ) Notice: Subject to any disclaimer, the term of this patent is extended or adjusted under 35 U.S.C. 154(b) by 883 days.

(21) Appl. No.: 10/642,592

(22) Filed: Aug. 19, 2003

(65) Prior Publication Data

US 2004/0052919 A1    Mar. 18, 2004

Related U.S. Application Data

(62) Division of application No. 09/685,023, filed on Oct. 10, 2000, now abandoned.

(30) Foreign Application Priority Data

Apr. 14, 2000    (JP) .............................. 2000-113614

(51) Int. Cl.
*A23L 1/015*    (2006.01)
(52) U.S. Cl. ..................... 426/487; 426/330; 426/422; 426/486; 426/589
(58) Field of Classification Search ..................... None
See application file for complete search history.

(56) References Cited

FOREIGN PATENT DOCUMENTS

| | | |
|---|---|---|
| FR | 2-253-466 A1 | 7/1975 |
| JP | 59-59180 | 4/1984 |
| JP | 61-115438 A | 6/1986 |
| JP | 03-047051 A | 2/1991 |
| JP | 04-346767 | 12/1992 |
| JP | 5-43454 A | 2/1993 |
| JP | 05-064563 | 3/1993 |
| JP | 6-209738 | 8/1994 |
| JP | 11-4664 A | 1/1999 |
| JP | 11-46726 A | 2/1999 |
| JP | 2000-41619 A | 2/2000 |

OTHER PUBLICATIONS

Chomiryo•Koshinryo no Jiten (Dictionary of Seasoning and Spice); p. 212 (Jul. 15, 1991).
Shimoda et al., J. Agric. Food Chem., vol. 44, pp. 3601-3605 (1996).

*Primary Examiner*—Lien Tran
(74) *Attorney, Agent, or Firm*—Birch, Stewart, Kolasch & Birch, LLP

(57) ABSTRACT

A fish sauce is treated for (2) to (16) hours at a pH of (9.0) to (10.0), under a temperature of (40° C.) or lower and under a reduced pressure of (80) to (180) Torr, and the pH is then adjusted, if required, to be (4.5) to (7.0), to thereby obtain a final fish sauce which contains specific odor components having specific values or less as determined by gas chromatography, and which thus contains an acceptable level of undesirable odor components.

6 Claims, No Drawings

FISH SAUCE AND METHOD FOR PRODUCING SAME

This application is a divisional of application Ser. No. 09/685,023, filed on Oct. 10, 2000, now abandoned the entire contents of which are hereby incorporated by reference and for which priority is claimed under 35 U.S.C. § 120; and this application claims priority of application Ser. No. 113614/2000 filed in Japan on Apr. 14, 2000 under 35 U.S.C. § 119.

BACKGROUND OF THE INVENTION

This invention relates to a fish sauce for use as a seasoning or taste enhancer, in which no peculiar or undesirable odor is present. There are a number of fish sauces available, prepared from a variety of fish and shell fish, which are used as seasonings or taste enhancers. Among the more well-known are nuoc mam, nampla (nom pla) and patis, used in Southeast Asia; and Ishiri (derived from squid organs during the production of dried squid), Shottsuru (derived from stand fish, and others), and Ikanago (derived from sand eel) which are all used in Japan. Each of these seasonings has its own characteristic flavor (referred to as 'umami' in Japanese) and they are useful for enhancing the taste of foods or imparting a new taste to foods. Fish sauces have been drawing attention for their characteristic flavor and they are used in various foods. However, the use of fish sauces are limited to certain food groups, since in other food groups, any underlying undesirable odor existing in fish sauce tends to impair the taste of the food rather than enhance the taste or induce a new taste.

To overcome the problems of undesirable odors in fish sauces, various methods for their removal have been proposed. These include a method using ultrafiltration (Japanese Unexamined Patent Publication No. 346767/1992); a method in which the pH of the fish sauce is adjusted and the resulting sauce is subsequently subjected to steam distillation (Japanese Unexamined Patent Publication No. 64563/1993); and a method comprising adsorbing volatile amines to undecomposed products of koji (malted rice) (Japanese Unexamined Patent Publication No. 47051/1991). However, each of these methods is subject to problems. The ultrafiltration method, while being useful for removing certain undesirable odor components, is not able to remove all of the undesirable odor components liable to produce unpleasant, fermentation and briny odors, and there is a tendency to also remove palatable odor components along with those which are not desirable. In the method comprising adjusting the pH of a fish sauce and subsequently subjecting it to steam distillation, whereby undesirable odor components tend to remain in the sauce; and, in particular, it is not possible to remove briny and fermentation odor components using the said method. Also, in using the method whereby volatile amines are adsorbed by undecomposed products of koji, an undesirable koji-type odor is imparted to the sauce, and it is also not possible to remove fully those substances which give rise to undesirable odors, other than amines.

SUMMARY OF THE INVENTION

Accordingly, it is an object of the present invention to identify particular substances which give rise to undesirable odors, and which are liable to impair the flavor of a food in which a fish sauce is used, and to remove such substances without compromising the overall 'umami' (good taste) or flavor of the sauce, by leaving intact substances which produce desirable odors.

DETAILED DESCRIPTION OF THE INVENTION

To attain the above object, the inventors of the present invention studied in depth odor components in fish sauces, and identified 2-methylpropanal, 2-methylbutanal, 2-ethylpyridine, and dimethyl trisulfide as odor components which are undesirable and which impair the flavor of foods in which the fish sauce is used. The inventors further conducted extensive studies into how to effectively and efficiently remove such odor components. As a result of these studies, the inventors determined that undesirable odor components could be removed effectively and efficiently by treating fish sauces for a predetermined length of time under specified alkaline conditions. Removal of these components by the method disclosed enables a fish sauce to be produced which can be used with a wide range of foods, since no undesirable odor or taste is imparted to a food in which it is used. The present invention has been accomplished on the basis of these findings.

One object of the present invention is to provide a fish sauce which fulfils by one of the relations (1)-(4) below. When the fish sauce is analyzed by adding 3 μl of 1% cyclohexanol as an internal standard to 50 g of the fish sauce, calculated to comprise a salt content of 22% and a total nitrogen content of 1.7%, with odor components in the fish sauce then being recovered and subjected to analysis using gas chromatography:

(1) The ratio of the peak area value of 2-methylpropanal to the peak area value of the internal standard substance is about 2.5 or less, preferably about 2.0 or less;
(2) The ratio of the peak area value of 2-methylbutanal to the peak area value of the internal standard substance is about 0.8 or less, preferably about 0.4 or less;
(3) The ratio of the peak area value of 2-ethylpyridine to the peak area value of the internal standard substance is about 0.002 or less, preferably about 0.001 or less; and
(4) The ratio of the peak area value of dimethyl trisulfide to the peak area value of the internal standard substance is about 0.02 or less, preferably about 0.012 or less.

Particularly preferred is a fish sauce in which, of the above odor components, preferably at least one of 2-ethylpyridine and dimethyl trisulfide has been removed. Hence, the preferred fish sauce of the present invention is a fish sauce in which the odor components fulfill one or more of the following relations under the above-mentioned analysis conditions:

(3) The ratio of the peak area value of 2-ethylpyridine to the peak area value of the internal standard substance is about 0.001 or less; and
(4) The ratio of the peak area value of dimethyl trisulfide to the peak area value of the internal standard substance is about 0.012 or less.

However, in using gas chromatographic analysis an error range of ±20% is to be expected. Thus, even if one analysis result shows an area ratio exceeding the relations (1) to (4), a fish sauce will meet the criteria of the present invention if the average value of a number of measurements taken fulfills any of the relations (1) to (4).

Another object of the present invention is to provide a method for producing a fish sauce, comprising the step of decreasing the content of at least one odor component selected from the group consisting of 2-methylpropanal, 2-methylbutanal, 2-ethylpyridine, and dimethyl trisulfide; and a fish sauce produced by the method. By using the method of the present invention, it is possible to produce a fish sauce having a desired quality which, when added as flavor enhancer or seasoning to food imparts no undesirable odor.

In accordance with the present invention, the step of decreasing a content of an undesirable odor component(s) comprises treating a fish sauce at a pH of weak alkalinity under a reduced pressure of about 80 to 180 Torr. The preferred treating time is 30 minutes or more, and more preferably 2 to 16 hours. After treatment under reduced pressure, the pH of the fish sauce is preferably readjusted to 4.5 to 7.0, as required.

The term 'fish sauce' refers to a liquid seasoning or taste enhancer in which fish comprises the base material. Examples are fish sauces produced in Southeast Asia by aging fish in the presence of salt, and seasonings and flavor enhancers produced from fish protein by using proteases, or microorganisms containing proteases. Known examples are, although not restricted to, nuoc mam, nampla and patis in Southeast Asia, and Ishiri, Shottsuru, and Ikanago sauce in Japan. Generally, analysis of a fish sauce shows a salt content of 10 to 23%, and a total nitrogen content of 1.2 to 3.0%. In accordance with the method of the present invention, a high quality fish sauce containing an acceptable level of undesirable odor components can be produced using a fish sauce such as those mentioned above as a starting material. Alternatively, liquid materials which do not comprise finished fish sauces may be used as starting materials. Further, even a fish sauce which has been treated by a conventional method to reduce unpleasant odor components can be used as a starting material in the present invention, provided that its seasoning or flavor enhancing properties can be improved by reducing the content of at least one odor component belonging to the group consisting of 2-methylpropanal, 2-methylbutanal, 2-ethylpyridine, and dimethyl trisulfide.

The method for producing a fish sauce according to the present invention will now be described hereinbelow in more detail. First, an alkali such as sodium hydroxide is added to a fish sauce in which it is desired to reduce or eliminate an undesirable odor component(s), to thereby adjust the pH of the fish sauce to within a range of about 9.0 to 10.0, and desirably 9.2 to 9.8. The resulting mixture is treated for from about 2 to 16 hours, and desirably 3 to 10 hours, at a temperature of around 40° C. or lower, desirably 10 to 35° C., under a reduced pressure of between about 80 to 180 Torr, and desirably 90 to 150 Torr. Then, the mixture is neutralized using an acid, such as hydrochloric acid, to adjust its pH to within a range of about 4.5 to 7.0. These steps have been found by the inventors of the present invention to be highly effective and efficient in removing or reducing undesirable odor components such as 2-methylpropanal, 2-methylbutanal, 2-ethylpyridine, and dimethyl trisulfide. The treatment step under reduced pressure, should, if possible, be performed using a vacuum concentration device, the structure of which may be of a single-pot type or a falling type. A gas-liquid countercurrent contact device is also usable. Next, the insoluble residue is removed by filtration, and the filtrate is decolorized using activated carbon (e.g., steam-activated carbon or chemical-activated carbon), a synthetic adsorbent (e.g., iron-removing resin (PF, SB; Hokuetsu Tanso Company)), an adsorbent resin (KS, HS, AF (Hokuetsu Tanso Company)), or an ion exchange resin (e.g., XAD (Rohm & Haas)) to obtain a seasoning or flavor enhancer having a less pronounced color, and in which undesirable odor components are reduced to a satisfactory level or eliminated.

The fish sauce obtained by the present invention is normally a liquid, but may be further concentrated under a temperature of between about 40° C. to 80° C., desirably 50° C. to 65° C., and under a reduced pressure (e.g. between about 80 to 180 Torr, and desirably 90 to 150 Torr) to obtain a product in the form of a paste having a water content of 12% to 35%, and desirably 17% to 25%. In effecting further concentration in order to produce such a paste, undesirable odor components are further reduced, and the resulting fish paste seasoning or taste enhancer exhibits minimal undesirable odors and has a wide range of uses.

In addition, a fish sauce or paste treated by the above-described method may be concentrated to such an extent that a powder is obtained. In such a concentrated seasoning or flavor enhancing substance, any undesirable odor components are reduced to a minimum.

The contents of the odor components selected from the group consisting of 2-methylpropanal, 2-methylbutanal, 2-ethylpyridine, and dimethyl trisulfide in the fish sauce of the present invention are around ½ or less, preferably around ⅓ or less of those of a conventional fish sauce before treatment under reduced pressure and alkaline conditions. In the fish sauce of the present invention, the content of at least one of 2-ethylpyridine and dimethyl trisulfide among identified odor components is reduced to around ½ or less, and preferably around ⅓ or less of that of a conventional fish sauce before treatment under reduced pressure and alkaline conditions.

In order to analyze the odor components in a fish sauce using gas chromatography, 3 μl of 1% cyclohexanol is added as an internal standard to 50 g of a fish sauce to be analyzed, calculated to comprise a salt content of 22% and a total nitrogen content of 1.7%, with odor components in the fish sauce then being adsorbed to an adsorbent by using a purge and trap method. The transposed odor components are subjected to gas chromatography, and detected using a FID detector. Odor components can be expressed as a ratio of a peak area of a separated odor component to a peak area of cyclohexanol.

To identify an odor component, a retention time derived from a gas chromatogram is utilized. Namely, the relation between an odor component and a normal alkane, as determined by their retention times, is used as a basis on which to calculate a characteristic value (hereinafter referred to as a RI value). It should be noted that since deviations as great as ±20% may exist in any given RI value, a margin of error of the same magnitude is taken into account in expressing a given RI value. Odor components having RI values of interest are subjected to gas chromatography-mass spectrometry to analyze mass spectra thereof. The resulting spectra are compared with the spectra of known substances to identify odor components of interest. Details of the analytical methods are as follows:

Characterization of Peaks of Undesirable Odors and Calculation of RI Values

First, odor components are separated from a fish sauce. Separation is performed by using a purge and trap method employing Tenax Odor-Collecting Set (cat. no. 2709-66026) of GL Science Company. An eggplant type flask (100 ml) is charged with 50 g (about 42 ml) of a sample. An internal standard substance (1% cyclohexanol solution) is added in an amount of 3 μL. The mixture is kept for 3 minutes at 40° C., and then purged at 40° C. with 50 ml/min of a high purity nitrogen gas to adsorb the odor components of the sample to the odor trapping agent (Tenax TA). The adsorbing trapper is mounted on a volatile component concentration/introduction device (PTI/TCT CP-4010, GL Science). Then, the trapped odor components are injected into a gas chromatography column.

Conditions for Gas Chromatography
Gas chromatograph: G3900, Hitachi, Ltd.
Concentration/introduction device: CP4010, GL Science
Column: CP-WAX
Column size: 60 m×0.25 mm ID 0.25µ
Detector: FID
Conditions for analysis:
  Starting temperature 50° C.
  End temperature 230° C.
  Temperature raising rate: 2° C./min
Injection temperature: 200° C.
Detector temperature: 250° C.
Helium gas flow rate: 20 cm/S
Internal standard: 1% cyclohexanol The retention index (RI) is calculated by using the following equation in the conventional manner:

$$RI=100 \times Z+(tR(\text{test substance})-tR(Z))/(tR(z+1)-tR(Z)) \times 100$$

where tR denotes the retention time, and Z denotes the carbon number of normal alkane.

In regard to the nature of an odor, the outlet of the column in the gas chromatograph is bifurcated, with one of the branches of the bifurcation structure leading to the detector (FID), and the other branch serving as an outlet through which the odor can be inhaled. Through this outlet, the odor is inhaled to determine characterization of respective peaks.

Identification of Components of Undesirable Odor

Peaks characterizing an undesirable odor are analyzed by means of gas chromatography-mass spectrometry so as to identify components. These components are separated under the same conditions as those applied in the gas chromatographic analysis.
Gas chromatograph-mass spectrometer: JXS-DX303, JEOL
Ionization method: Electron impacted ionization
Ion source temperature: 200° C.
Scan rate: 25-500 amu
Scan time: 1 second
Analyzer: JMA-DA5000, JEOL Based on the RI values of the peaks representing undesirable odors as provided by gas chromatography, the substances which gave rise to each peaks in the gas chromatography are compared with known substances which will give rise to the peaks having the same RI values. The nature of the odor is confirmed by inhalation and the RI values of the pure substances are recalculated to establish the identity of the substances.

The retention indices (RI) of the undesirable odor components provided by the foregoing analytic method are 817±20 for 2-methylpropanal, 926±20 for 2-methylbutanal, 1,289±20 for 2-ethylpyridine, and 1,378±20 for dimethyl trisulfide.

In accordance with the present invention, undesirable odor components of a fish sauce that impair the flavor of food have been extensively investigated. Investigation, using gas chromatography and gas chromatograph-mass spectrometry as means for analyzing odor components, show that odor components that are strongly incompatible with foods exist in 2-methylpropanal, 2-methylbutanal, 2-ethylpyridine, and dimethyl trisulfide, other than amines (typified by trimethylamine) which have been conventionally reported to be causative substances. Needless to say, proportions of odor components in fish sauces vary from one place of production to another. The presence of one or more of these components in a fish sauce was found to impair the flavor of a food to which the fish sauce was added. Specifically, the odor components, 2-methylpropanal, 2-methylbutanal, 2-ethylpyridine, and dimethyl trisulfide, are characterized by a scorching odor, a sour and scorching odor, an immature fish odor, and a foul odor, respectively. The foregoing are particularly strong, undesirable odor components, and are substances which are present generally in fish sauces, and which can be said to impair the flavor of food. By adjusting at least the odor components, 2-ethylpyridine and dimethyl trisulfide, to comparative ratios as judged by an internal standard of ≦0.002 to 0.001 and ≦0.02 to 0.012, respectively, a desired fish sauce can be obtained which, when added to food, does not impair its flavor. One preferred internal standard is cyclohexanol.

Conventional fish sauces tend to give rise to considerably undesirable taste when added to some groups of foods as a seasoning even in small amounts. For example, conventional fish sauces are not suitable as a seasoning for the soup of 'Oden' (a Japanese traditional cooked food), since they tend to impair the flavor of dried bonito and adversely influence the delicate balance between taste and flavor of the soup. In contrast, in a fish sauce produced by the method of the present invention wherein those components which produce an undesirable odor are removed to satisfactory levels, such a sauce can be used as a seasoning or taste enhancer even in Oden soup without adversely affecting the delicate flavors of dried bonito and soy sauce. Furthermore, it has been found that by using the method of the present invention a synergistic effect is produced, whereby flavor components, other than undesirable odor components, enhance the flavor of dried bonito.

Thus, not only is the present invention capable of providing a fish sauce having a reduced level of undesirable odor components, it also synergistically enhances the good taste and desirable odor components.

The present invention will now be described in more detail by way of the non-limiting Examples given below.

EXAMPLE 1

Sodium hydroxide was added to about 60 kg of a fish sauce of Thai origin having a salt content of 22% and a total nitrogen content of 1.7% (a product of Thai Fish Sauce Company) to adjust the pH of the fish sauce to 9.5. Then, the mixture was introduced into a single-pot type vacuum evaporator with a capacity of about 200 liters, an internal diameter of about 60 cm, and a height of about 80 cm) equipped with a multi-jet condenser. After a temperature of 35° C. was reached, the pressure was reduced to a vacuum of 120 Torr. While maintaining a temperature of 35° C., the mixture was stirred for 5 hours. After completion of the treatment under reduced pressure, the mixture was adjusted using hydrochloric acid to have a pH of 5.2, and any insoluble residue was removed using a filter cloth. Then, the mixture was concentrated under reduced pressure by means of a condenser to obtain a water content of about 65% and a salt content of about 22% to provide a final fish sauce.

EXAMPLE 2

The fish sauce prepared by the method described in Example 1 was introduced into a single-pot type vacuum evaporator (With a) capacity of about 200 liters, an internal diameter of about 60 cm, and a height of about 80 cm) equipped with a multi-jet condenser. After a temperature of 60° C. was reached, the pressure was reduced to a vacuum of 120 Torr. While maintaining a temperature of 60° C., the mixture was brought to Brix 50%. The precipitated components were removed by filtration using a filter cloth. The filtrate was further concentrated under reduced pressure to Brix 74% to obtain a fish sauce paste having a water content of about 20% and a salt content of about 34%.

Comparative Example 1

A fish sauce of Thai origin (a product of Thai Fish Sauce Company) was subjected to an ultrafiltration membrane (SIP-1013, molecular weight separation limit 6,000; ASAHI CHEMICAL INDUSTRY) to provide an adjusted water content of about 65% and a salt content of about 22%, thereby obtaining a fish sauce.

Comparative Example 2

A fish sauce of Thai origin (a product of Thai Fish Sauce Company) was adjusted using sodium hydroxide to have a pH of 8.4. 500 ml of the fish sauce was placed in a 2-liter three-necked flask, heated under stirring using a heating mantle, and placed under reduced pressure using a water jet aspirator. When the fish sauce started to boil at a reduced pressure of about 50 to 60 Torr, steam was blown off its surface. Steam distillation was then performed for around 1 hour to obtain about 430 ml of a liquid. The resulting liquid was readjusted with hydrochloric acid to obtain a pH of 6.0, and insoluble components were removed by filtration. Then, the filtrate was concentrated under reduced pressure using a rotary evaporator to obtain a water content of about 65% and a salt content of about 22%, thereby providing a final fish sauce.

The final products of Example 1, Example 2, Comparative Example 1, and Comparative Example 2 were each analyzed by gas chromatography. The contents of substances having the aforementioned RI values were determined by ratios of their areas to the area of the internal standard substance.

Comparative Test Example 1

Odors of the untreated fish sauce, the fish sauces of Examples 1 and 2, and the fish sauces of Comparative Examples 1 and 2 were analyzed by using a gas chromatographic analysis method. The results are shown in Table 1.

TABLE 1

Content of Substance

| Substance | Untreated fish sauce | Ex. 1 | Ex. 2 | Comp. Ex. 1 | Comp. Ex. 2 |
|---|---|---|---|---|---|
| 2-Methylpropanal | 4.66 | 1.98 | 1.88 | 3.89 | 2.55 |
| 2-Methylbutanal | 1.34 | 0.4 | 0.3 | 1.15 | 1.02 |
| 2-Ethylpyridine | 0.0046 | 0.00098 | 0.00087 | 0.0049 | 0.0028 |
| Dimethyl trisulfide | 0.045 | 0.011 | 0.012 | 0.052 | 0.041 |

In the fish sauces of Examples 1 and 2, levels of the respective odor components were found to have been reduced to ½ to ⅓ or less of their level in the untreated fish sauce, and also to have been reduced as compared with Comparative Examples 1 and 2. The values were obtained by dividing the area value of each component as the numerator by the area value of the internal standard substance as the denominator.

Comparative Test Example 2

Sensory evaluation of the fish sauces of the Examples and the Comparative Examples and the untreated fish sauce was then made. First, a 5% dilution of each of the fish sauces was prepared, and evaluated by 16 trained panelists who assigned a score ranging from 1 to 5 points, with 5 representing strong characteristics and 1 weak. Desirability was also evaluated in terms of a five point scale, with 1 point representing most desirable characteristics and 5 points the least. The results are shown in Table 2.

TABLE 2

Sensory Evaluation of 5% Dilution

| | Untreated fish sauce | Ex. 1 | Ex. 2 | Comp. Ex. 1 | Comp. Ex. 2 |
|---|---|---|---|---|---|
| Undesirable odor | 4.8 | 2.3 | 2.0 | 3.8 | 3.3 |
| scorching odor | 3.9 | 2.8 | 2.3 | 4.1 | 3.6 |
| Fishy odor | 4.3 | 1.6 | 1.7 | 3.6 | 3.0 |
| fermentation odor | 3.7 | 1.9 | 2.0 | 3.5 | 3.6 |
| foul odor | 4.5 | 2.0 | 1.8 | 3.7 | 3.3 |
| Putrid odor | 4.0 | 2.2 | 2.3 | 3.0 | 3.2 |
| Overall evaluation (desirability) | 4.3 | 1.8 | 1.7 | 3.1 | 2.9 |

The fish sauces of Examples 1 and 2 were found to be weak in terms of undesirable odor characteristics, as compared with the untreated fish sauce and the fish sauces of Comparative Examples 1 and 2.

Comparative Test Example 3

The fish sauces of the Examples and the untreated fish sauce were each added as part of a soup stock for Japanese 'oden'. The resulting Oden soup stocks were each evaluated by 16 trained panelists using a scale of from 1 to 5 points for each item, with 5 points representing the most desirable characteristics, and 1 the least. The composition of the Oden soup stock is shown in Table 3. The results are shown in Table 4.

TABLE 3

Composition of Oden Soup Stock

| | No addition of fish sauce | Untreated fish sauce | Ex. 1 | Ex. 2 |
|---|---|---|---|---|
| Soy sauce | 3.5 | 3.5 | 3.5 | 3.5 |
| sweet rice wine | 2 | 2 | 2 | 2 |
| Soft sugar | 0.1 | 0.1 | 0.1 | 0.1 |
| MSG | 0.1 | 0.1 | 0.1 | 0.1 |
| Stock from dried bonito | 0.2 | 0.2 | 0.2 | 0.2 |
| Common salt | 0.57 | 0.24 | 0.24 | 0.1 |
| Water | 93.36 | 92.36 | 92.36 | 92.36 |
| Fish sauce | 0 | 1.5 | 1.5 | 0.4 |

TABLE 4

Sensory Evaluation of Oden Soup Stock

| | No addition of fish sauce | Untreated fish sauce | Ex. 1 | Ex. 2 |
|---|---|---|---|---|
| Aroma of soy sauce | 3.2 | 1.3 | 4.5 | 4.7 |
| Aroma of | 3.1 | 1.9 | 4.2 | 4.3 |

TABLE 4-continued

Sensory Evaluation of Oden Soup Stock

|  | No addition of fish sauce | Untreated fish sauce | Ex. 1 | Ex. 2 |
|---|---|---|---|---|
| dried bonito Overall desirability | 3.4 | 1.5 | 4.2 | 4.4 |

Oden soup stock to which the fish sauce of Example 1 has been added was judged as having desired aromas of dried bonito and soy sauce. Furthermore, the components in the fish sauce after removal of undesirable odor components served to enhance the flavors of soy sauce and dried bonito. This effect will not be achieved by simply incorporating a conventional fish sauce having a less decreased level of undesirable odor components as obtained by the prior arts. Thus, use of the fish sauce of Example 1 enables the flavor components of the fish sauce to enhance the deep taste and palatable flavor of the seasoning to be added to Oden soup stock thereby providing Oden soup stock with an improved overall quality and yet characteristic taste.

The results of Tables 1 to 4 demonstrate that a fish sauce having the aforementioned peak area value ratios (1) to (4) of 2-methylpropanal, 2-methylbutanal, 2-ethylpyridine, and dimethyl trisulfide to the internal standard substances is superior as a seasoning or taste enhancer to conventional fish sauces.

While the present invention has been described in the foregoing manner, it is to be understood that it is not limited thereby, but may be varied in a variety of different ways. Such variations are not to be regarded as departing from the spirit and scope of the invention, and all such modifications as would be obvious to one skilled in the art are intended to be included within the scope of the appended claims.

The entire disclosure of Japanese Patent Application No. 113614/2000 filed on 14 Apr. 2000 including specification, claims and summary is incorporated herein by reference in its entirety.

What is claimed is:

1. A method for producing a fish sauce having improved hedonic characteristics, comprising:

treating a fish sauce in which undesirable odor components are required to be reduced or eliminated, for 2 to 16 hours at a pH of 9.0 to 10.0, under a temperature of 40° C. or lower and under a reduced pressure of 80 to 180 Torr; and adjusting the pH of a resultant fish sauce to 4.5 to 7.0 if the pH of the resultant fish sauce is outside of the range of 4.5 to 7.0.

2. A method for producing a fish sauce having improved hedonic characteristics, comprising:

treating a fish sauce, in which undesirable odor components are desired to be reduced or eliminated, for 2 to 16 hours at a pH of 9.0 to 10.0, under a temperature of 40° C. or lower and under a reduced pressure of 80 to 180 Torr, and adjusting the pH of a resultant fish sauce to 4.5 to 7.0 if the pH of the resultant fish sauce is outside of the range of 4.5 to 7.0; and further concentrating the treated fish sauce under a reduced pressure of 80 to 180 Torr, and a temperature of from 40 to 80° C. to obtain a water content in the fish sauce of 10% to 35%, thereby converting the fish sauce to a paste.

3. A method for producing a fish sauce with improved hedonic characteristics, comprising the steps of:

placing a fish sauce or a raw material for producing the fish sauce under reduced pressure of 80 to 180 Torr at a pH of 9.0 to 10.0, and under a temperature of 40° C. or lower, and if the pH of a resultant fish sauce is outside of the range of 4.5 to 7.0, adjusting the pH of the resultant fish sauce to 4.5 to 7.0 so as to reduce at least one undesirable odor component selected from the group consisting of 2-methylpropanal, 2-methylbutanal, 2-ethylpyridine, and dimethyl trisulfide, which is contained in the fish sauce or in the raw material for producing the fish sauce.

4. The method for producing a fish sauce as claimed in claim 3, wherein undesirable odor components are reduced to such an extent that when analyzed with gas chromatography with an internal standard comprising 3 µl of 1% cyclohexanol any one of the following relations (1) to (4) is fulfilled:

(1) The ratio of the peak area value of 2-methylpropanal to the peak area value of the internal standard substance is $\leq 2.0$;

(2) The ratio of the peak area value of 2-methylbutanal to the peak area value of the internal standard substance is $\leq 0.4$;

(3) The ratio of the peak area value of 2-ethylpyridine to the peak area value of the internal standard substance is $\leq 0.001$; and (4) The ratio of the peak area value of dimethyl trisulfide to the peak area value of the internal standard substance is $\leq 0.012$.

5. The method for producing a fish sauce as claimed in claim 4, wherein undesirable odor components are reduced to such an extent as to satisfy any one of the relations (3) and (4) as defined in claim 4.

6. The method for producing a fish sauce as claimed in any one of claims 3 to 5, wherein at least one of the undesirable odor components selected from the group consisting of 2-methylpropanal, 2-methylbutanal, 2-ethylpyridine, and dimethyl trisulfide is reduced to half or less of that existing in the fish sauce before treatment under reduced pressure.

* * * * *